(12) United States Patent
Bernhardt et al.

(10) Patent No.: US 9,456,613 B2
(45) Date of Patent: Oct. 4, 2016

(54) METHOD FOR FORMING DOUGH PIECES

(71) Applicant: Fritsch GmbH, Markt Einersheim (DE)

(72) Inventors: Udo Bernhardt, Iphofen (DE); Rainer Wagner, Martinsheim (DE)

(73) Assignee: FRITSCH GMBH, Markt Einersheim (DE)

( * ) Notice: Subject to any disclaimer, the term of this patent is extended or adjusted under 35 U.S.C. 154(b) by 0 days.

(21) Appl. No.: 14/746,161

(22) Filed: Jun. 22, 2015

(65) Prior Publication Data
US 2015/0282494 A1 Oct. 8, 2015

Related U.S. Application Data

(62) Division of application No. 13/697,840, filed as application No. PCT/DE2011/000121 on Feb. 9, 2011, now Pat. No. 9,101,145.

(30) Foreign Application Priority Data

May 21, 2010 (DE) .......... 10 2010 021 149
Jul. 1, 2010 (DE) .......... 10 2010 027 622

(51) Int. Cl.
*A21C 3/08* (2006.01)
*A21C 9/08* (2006.01)

(52) U.S. Cl.
CPC *A21C 9/088* (2013.01); *A21C 3/08* (2013.01)

(58) Field of Classification Search
CPC .............................. A21C 3/08; A21C 9/088
USPC ........ 426/499, 500, 512; 425/323, 324, 320, 425/321, 334, 391, 393, 364 R, 441, 442, 425/145, 150, 171
See application file for complete search history.

(56) References Cited

U.S. PATENT DOCUMENTS

| | | | | |
|---|---|---|---|---|
| 3,315,618 A | * | 4/1967 | Groff | 264/299 |
| 3,485,185 A | * | 12/1969 | Brunner | A21C 3/08 |
| | | | | 425/323 |
| 4,582,472 A | * | 4/1986 | Hanson | 425/139 |
| 5,354,571 A | * | 10/1994 | Morikawa et al. | 426/496 |
| 5,382,154 A | * | 1/1995 | Morikawa et al. | 425/321 |
| 5,421,714 A | * | 6/1995 | Morikawa et al. | 425/321 |
| 5,702,732 A | * | 12/1997 | Piller | 425/145 |
| 5,766,663 A | * | 6/1998 | Neumann et al. | 426/499 |
| 6,036,990 A | * | 3/2000 | Shlyakhovsky | 426/500 |
| 6,994,881 B2 | * | 2/2006 | Colamussi | 426/496 |
| 8,173,191 B2 | * | 5/2012 | Bernhardt | 426/499 |
| 2007/0048423 A1 | * | 3/2007 | Bernhardt | 426/499 |
| 2010/0159098 A1 | * | 6/2010 | Bernhardt | 426/499 |
| 2010/0233340 A1 | * | 9/2010 | Bernhardt | 426/499 |

FOREIGN PATENT DOCUMENTS

DE 4039793 * 5/1994 .............. A21C 9/08

* cited by examiner

*Primary Examiner* — Seyed Masoud Malekzadeh
(74) *Attorney, Agent, or Firm* — Quarles & Brady LLP

(57) ABSTRACT

A method and device for forming dough in a U or annular shape includes a gripper carrier, at least one retaining jaw attached to the gripper carrier and first and second pivot carriers. The pivot carriers are each supported about a respective pivot axis in the gripper carrier and perform an opposite pivot motion. The second pivot carrier is supported by a shaft that extends into and engages the gripper carrier, such that a pivotal motion of the second pivot carrier engages the shaft with the gripper carrier to simultaneously pivot and lift the second pivot carrier so to lift one end of the dough piece in relation to another end of the dough piece. Shaping jaws are attached to the first and second pivot carriers and can be brought into contact with the respective dough piece on an opposite second side.

14 Claims, 7 Drawing Sheets

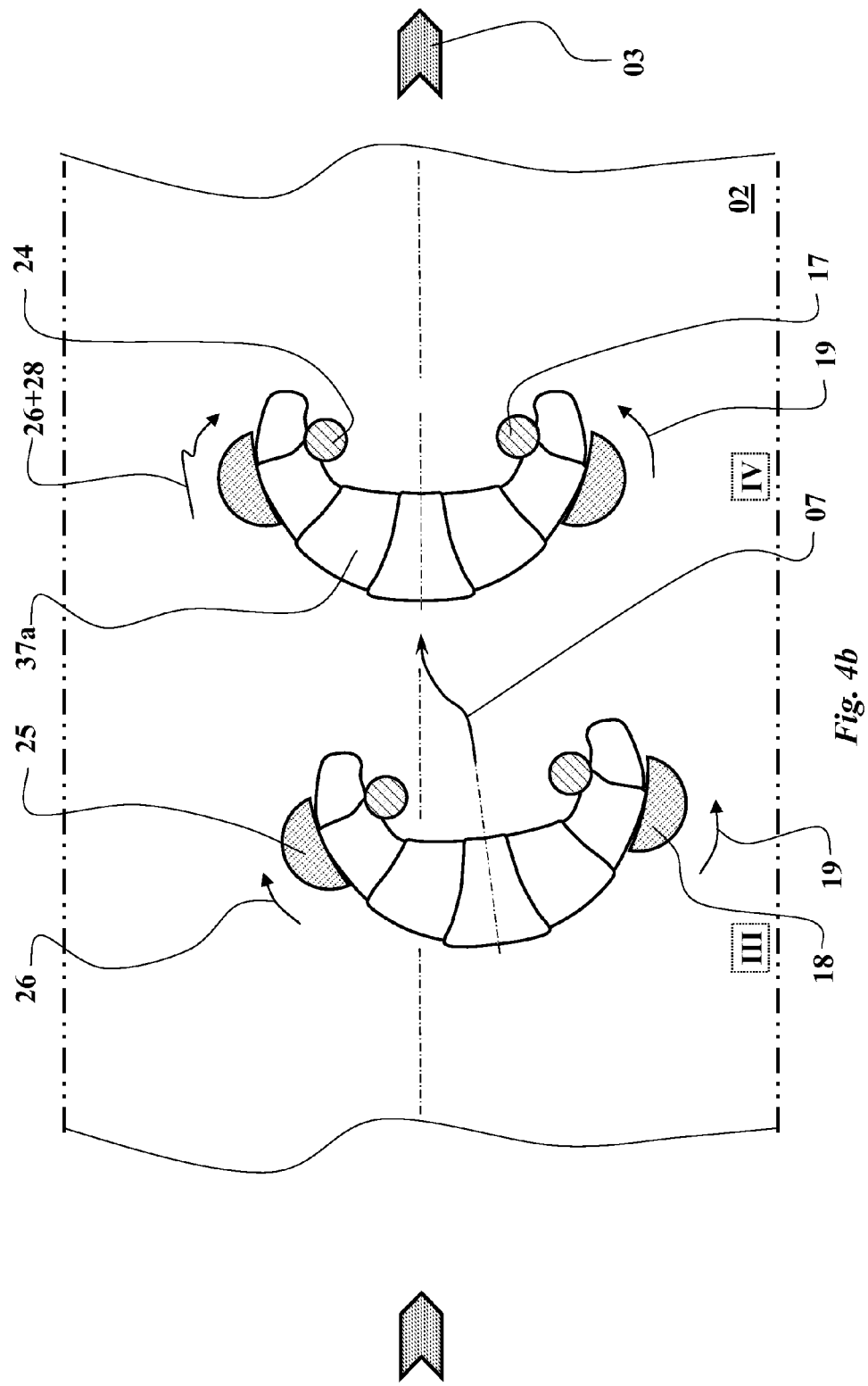

METHOD FOR FORMING DOUGH PIECES

CROSS-REFERENCE TO RELATED APPLICATIONS

This application is a divisional application of U.S. patent application Ser. No. 13/697,840 filed Nov. 14, 2012, now issued as U.S. Pat. No. 9,101,145, which is the National Stage of International Application No. PCT/DE2011/000121 filed on Feb. 9, 2011, and claims priority to German Patent Application No. DE 10 2010 021 149.4 filed May 21, 2010 and German Patent Application No. 10 2010 027 622.7 filed Jul. 19, 2010. The contents of each of these applications is hereby incorporated by reference herein as if set forth in its entirety.

DESCRIPTION OF THE DISCLOSED EMBODIMENTS

The invention relates to a device and a method for forming dough pieces from a straight shape into a curved or annular shape.

From the state of the art different devices and methods are known for bringing dough pieces into a curved or annular shape. For this purpose the prepared straight dough pieces are fed into an appropriate device. The dough pieces are in particular croissant dough pieces, which are wound from triangular dough sheets. By means of the device the dough pieces are bent into a U-shaped form, which is particularly characteristic for croissants. Then the shaped dough pieces are forwarded to the subsequent processes and baked.

For continuous mass production, conveyor belts, on which the dough pieces are moved, are used in particular.

In one embodiment it is known from the state of the art to simultaneously use said conveyor belt for shaping the dough pieces. For this purpose the conveyor belt develops from a flat appearance into a largely closed pipe and turns flat again towards the end of the respective conveyor belt. In this way, the dough piece is given its annular shape by the conveyor belt while being transported along the conveyor belt.

The problem with this prior art is the fact that the dough piece must not tilt sideways or shift during the movement of the conveyor belt. This, however, can hardly be ensured during a running production process. Therefore deficient products or malformed dough pieces occur regularly, which then have to be discarded.

For avoiding this problem, a further system is known from the prior art, in which two lateral conveyor belts are disposed vertically to the horizontal conveyor belt, the two vertical belts effecting a pulling-in of the lateral ends of the dough pieces. It is also known to use inclined brushes which create an initial curved form of the dough piece ahead of the horizontally disposed conveyor belts. An example for this embodiment is shown by document DE 100 34 177 B4. For the dough piece not to be shifted from its position by the lateral vertical conveyor belts, the dough piece can be centrally retained by a retaining element. Thus the lateral conveyor belts lead to a bending of the dough piece around the central retaining element. In this way it is possible to bring dough pieces into a U-shaped form by means of a simple and quick process.

However, it is a complication in the implementation of this method that the dough piece has to be placed exactly in the middle of the conveyor belt since this is the only way to ensure that the two lateral conveyor belts bend the dough piece symmetrically. If, however, the previous process step cannot precisely place the dough piece on the conveyor belt, it is necessary to bring the dough piece into the middle by means of an additional device.

It is further disadvantageous in the aforementioned solution that it is not possible to hereby create an annular shape, which is crucial in particular due to the demand for a variation of the different dough shapes.

Therefore, it is the object of the present invention to provide a device for forming dough pieces, in which a U-shape and/or annular shape can be formed from the straight shape of the dough piece in a simple manner.

This object is attained by the solution of claim 1 according to the invention. A method according to the invention for producing respective U-shaped and/or annular dough pieces is proposed in the main method claim.

Advantageous embodiments of the invention are the subject matter of the dependent claims.

The generic device serves the purpose of forming substantially straight, particularly wound, croissant dough pieces into a U-shape or annular shape. The form of a straight dough piece does not necessarily presuppose an exact linear middle axis of the dough piece. Rather, it is an elongate dough piece which is formed predominantly straight. The purpose of a corresponding device is in particular the production of wound croissant dough pieces. They are first formed in the known manner from a wound triangular dough piece. The preferred embodiment of croissants is again U-shaped or annular.

According to the invention the device comprises a gripper carrier, to which at least one rigid or movable retaining jaw is attached. Said retaining jaw can be brought into contact with the dough piece on a first side. The first side herein refers to a top view of the dough piece, wherein the first side is a side of longitudinal extension of the dough piece. Further, two pivot carriers, which are each pivotably supported about a pivot axis in the gripper carrier are attached to the gripper carrier. The pivot carriers perform an opposite pivot motion. The opposite pivot motion is realized on the basis of a largely parallel pivot axis. However, also a small angle between the pivot axes is insignificant concerning the embodiment according to the invention. Depending on the relative movement of the pivot carriers in relation to the gripper carrier a bearing between the pivot carrier and the gripper carrier is present. A rigid or movable shaping jaw is in turn attached to the respective pivot carrier. The shaping jaws of the two pivot carriers can now in turn be brought in contact with the dough piece on the opposite second side. Herein it is initially insignificant if, regarding the middle axis of the dough peace, the retaining jaw and the shaping jaw are exactly opposed or offset to each other or oriented at an angle to one another. It is material that the retaining jaw and the shaping jaw are disposed on opposite sides and that the dough piece can be clamped between the retaining jaw and the shaping jaws.

The solution according to the invention proposes that by means of the pivot motion of the shaping jaws attached to the pivot carrier and by clamping between the retaining jaw and the shaping jaws the shaping of the dough piece is made possible. Thus the device creates the possibility to form U-shaped or annular dough pieces irrespective of their position by means of a retaining jaw and shaping jaws, as opposed to the state of the art. Therefore no other measures regarding the conveyor belt, such as lateral conveyor belts or belt guiding rods, are necessary for creating a U-shape. Further advantages over prior art arise in the area of hygiene since the device according to the invention only retains a small degree of dirt, such as dough residue, and in addition is easy to clean. Further, the gripper unit can be easily disengaged or taken out of the work zone if required, for example when an incorrectly rolled dough piece is fed into the device, in order to preclude any soiling from the start.

The device according to the invention is further advantageous regarding its required space within a production line. The highly compact structure of the gripper unit enables a space saving integration of the desired functionality of the positioning or bending of the dough pieces into a production line.

The use of a pivot drive on the gripper unit is particularly advantageous herein, as is the use of a pivot gear. The pivot motion of the pivot carrier is initiated by the pivot drive. The connection of the two pivot carriers, which move in an opposite direction, is realized by means of the pivot gear.

Due to the use of a pivot drive with the connection of the two pivot carriers by means of the pivot gear, it is possible in a simple manner to realize the coupled motion of the opposite pivot carriers. Further, it is ensured by this solution that the dough piece is shaped symmetrical. Herein it is possible to use a servo drive as a pivot drive as well as to realize the pivot motion by means of a linear drive, e.g. a pneumatic cylinder, via a crank rod.

Advantageously, the gripper unit further comprises a lifting device. Herein a pivot carrier and/or a shaping jaw are lifted in the direction of the pivot axis relative to the gripper and/or pivot carrier by the lifting device. The requirement of a possibly annular shape leads to the problem of the colliding ends of the dough piece during the shaping process. In order to avoid this problem it is advantageous if one end of the dough piece can be lifted in relation to the other end. Thus it is particularly advantageous if at the gripper unit a shaping jaw can be lifted relative to the gripper carrier. Herein it is possible, for example, to only lift the shaping jaw relative to the pivot carrier or to move the pivot carrier together with the shaping jaw relative to the gripper carrier.

The coupling of the pivot motion to the lifting motion is particularly advantageous for the realization of the lifting device. For this purpose it is possible to use a sliding block guide. The sliding block guide is disposed between the gripper carrier and the second pivot carrier. As a result of the pivot motion of the second pivot carrier the lifting motion is simultaneously initiated by the sliding block guide. Thus it is ensured that the corresponding lifting motion is performed in any case together with the pivot motion. For the realization of a sliding block guide the person skilled in the art has different options at their disposal. It is possible, for example, to equip the shaft to which the pivot carrier is attached with an annular ascending groove and to have a corresponding pin with a rigid connection to the gripper carrier engage into said groove. It is also possible to pull or push the shaft with the pivot carrier into a first direction by means of a spring force and to provide therein an annular ascending surface with a rigid connection to the shaft or to the gripper carrier, wherein on said surface a counter bearing with a rigid connection to the gripper carrier or to the shaft is supported. When the shaft rotates with the pivot carrier relative to the gripper carrier, the corresponding axial motion is triggered by the ascending surface.

From the processes it has been found problematic that the annular shape cannot be ensured in any case without further action after the forming has been completed. Therefore it is advantageous if a press plunger is disposed in the middle plane of the gripper unit and is movable substantially parallel to the pivot axes by means of a plunger drive. Herein the motion of the press plunger leads to a pressing of the ends of the dough piece lying on top of each other. Therefore the press plunger is to be placed in a position on the gripper carrier in which the ends of the dough pieces in annular form lie on top of each other. The pressing of the ends of the dough pieces makes sure that after the gripper lets go of the dough piece the dough does not lose its annular shape. Hereby it is achieved that the dough piece largely retains its annular form as desired after having been baked.

In this process the motion of the press plunger is coupled with the motion of the shaping jaws, such that the shaping jaws perform a retreating motion when the pressing process begins, i.e. the clamped dough pieces are released. This process ensures that the dough material which is pushed outwards during the pressing of the ends of the dough pieces does not lead to an undesired deformation of the dough piece. Since the position is ensured already at the beginning of the pressing process and the shaping jaws are no longer needed for retaining the dough piece they can advantageously be detached from the dough piece during the pressing process.

Advantageously the gripper unit is embodied in such a manner that the shaping jaws can be moved relative to the retaining jaw. Thus it is possible to realize the clamping of the dough piece without the dough piece being improperly squeezed. The retaining motion of the shaping jaw herein is preferably performed vertically to the middle axis of the dough piece. For this purpose it is possible to position the shaping jaw so as to be turnable on the pivot carrier. Therefore the turn axis of this bearing between the shaping jaw and the pivot carrier is preferably oriented parallel to the middle axis of the dough piece. Alternatively it is possible to position the shaping jaw so as to be longitudinally adjustable on the pivot carrier. For this purpose it is advantageous to orient the adjusting axis substantially vertically to the middle axis of the dough piece and vertically to the pivot axis.

For the embodiment of the gripper unit concerning the clamping of the dough piece different options are available. Herein it is possible in one embodiment to symmetrically position a retaining jaw in the middle plane of the gripper unit. The retaining jaw can be rigidly attached to the gripper carrier or can alternatively be disposed so as to be height adjustable in an axis parallel to the pivot axes. For forming the dough pieces the shaping jaws circle around the retaining jaw with the pivot motion. By using a single central retaining jaw a particularly simple structure of the gripper unit is realized.

However, it is particularly advantageous to rigidly attach a retaining jaw on each pivot carrier. For that reason two retaining jaws are provided on the gripper carrier. Since the retaining jaws are connected to the pivot carriers, they are consequently moved in opposite direction with the pivot carrier.

By using a retaining jaw on each pivot carrier it is in particular made possible to position the shaping jaw substantially opposite of the retaining jaw. Thus a secure clamping of the dough piece between the respective shaping jaw and the associated retaining jaw is made possible. Further it is made possible by this embodiment to exert a certain pull on the dough piece and thus slightly elongate it. Considering the advantageous lifting motion of a pivot carrier, this positioning of the retaining jaw opposite of the shaping jaw in particularly leads to a secure guidance of the clamped end of the dough piece during the lifting motion.

The form of the shaping jaw and the retaining jaw is secondary as a start. They can be formed with a circular cross section, as well as rounded or angular. However, it is particularly advantageous for the fixed retaining jaw if the contact surface with which the dough piece comes into contact has a circular or convex form in its cross section. In the direction of its longitudinal axis the fixed retaining jaw preferably has a cylindrical shape or an at least in parts tapering, in particular conical shape. Due to the tapering of the fixed retaining jaw a sticking of the dough piece during the detachment of the retaining jaw by retracting the gripper unit is avoided.

It is advantageous for ensuring the shape of the dough piece and the taking along of the respectively clamped ends of the dough piece and also for avoiding a sticking to the retaining jaw and/or the shaping jaw if the contact surface of the shaping jaw and/or the retaining jaw with which the dough piece comes into contact has a smooth surface.

It has proven to be particularly advantageous to have the retaining jaw in its circumference turn conical towards its end. This is particularly advantageous when the retaining jaw is retracted from the dough piece. The conical shape leads to a relatively easy removal of the dough piece without any dough residue left behind on the retaining jaw when the retaining jaw is retracted in a vertical motion relative to the dough piece. Thus there is no unwanted scraping motion or deformation of the dough piece when the gripper unit is vertically retracted. It is obvious that in order to achieve this advantageous effect all that is necessary is an inclination of the side of the retaining jaw which comes into contact with the dough piece and that therefore the lateral or rear surfaces or the circumference of the retaining jaw can be formed arbitrarily.

The application of the device according to the invention requires at least the positioning of the gripper unit relative to the respective dough piece that is to be formed. This can for example be done by exactly positioning the dough piece and lifting it. However, the application of a displacement unit on the device is advantageous, wherein by means of said displacement unit the gripper unit can at least be moved in a transport direction of a conveyor belt and in an axis vertical to the conveyor belt.

By using a displacement unit it is made possible in particular to form the dough pieces on a running conveyor belt by means of the gripper unit. Herein the gripper unit can be lowered to the respective dough piece and the dough piece can be formed while being transported. Thus, for forming the dough piece during the process, the only thing that is necessary in addition to the device is the conveyor belt.

It is particularly advantageous to use a displacement unit which is further movable in a direction transverse to the conveyor belt and therein, particularly for gripping, can be pivoted around a vertical axis. Due to this embodiment it is possible in particular to grip and/or place the dough piece in a desired position on the conveyor belt and to position the gripper correspondingly above the respective dough piece. Thus the problem known from the state of the art of having to place the straight dough piece exactly on the conveyor belt is overcome.

The form of the displacement unit herein is optional. Different well-known solutions are available to the skilled person for this purpose. This can be, for example, a multi-axial robot or a portal displaceable in two axes with a supplemental pivot and lifting device. Also other solutions are obvious and not significant for the present invention.

Further it is particularly advantageous if the gripper unit can be exchangeably attached to the displacement unit by means of a tool changing device. Thus the user has the option of respectively adjusting a production line to different types of dough pieces, in particular to dough pieces of different sizes or forms, by a simple change between differ- ent gripper units. Additionally, by removing the gripper unit an easy and thorough cleaning or maintenance of the components of the gripper unit can be made possible, in particular without shutting down the production line.

According to a preferred embodiment, several gripper units, in particular being positionable independently of each other, are attached to the displacement unit. Thus, for example in a production line, a number of dough pieces can be positioned and/or bent at once by the different gripper units, such that the throughput of the unit correspondingly increases.

The implementation of the process for shaping the dough piece with a corresponding device is improved in particular if the device comprises a position scanner with an analyzing unit. Herein the position of a dough piece can be ascertained by the position scanner on the conveyor belt. The type of position scanner is optional, as long as it is made sure that the spatial position is registered from above looking down on the conveyor belt. It can be an imaging system, such as a camera, or ultrasound sensors or the like. It is at least relevant that the respective position of the dough piece and therefore the deviation from a reference position is registered. Thus, the gripper unit can be placed in the correct position relative to the dough piece by the displacement unit. It is thus made possible to place the dough piece arbitrarily on the conveyor belt, wherein the device automatically registers the position of the dough piece and can put the gripper unit in a corresponding position above the dough piece.

It is further made possible by the embodiment according to the invention with an advantageous application of a displacement unit and a position scanner to subsequently bring the dough piece into a target position by using the gripper unit. This transport from a starting position of the dough piece to a target position can be done during the transport on the conveyor belt and herein during the shaping as well as before or after or interrupting the shaping process.

The new solution therefore presents a method according to the invention for producing U-shaped or annular dough pieces from substantially straight, particularly wound, croissant dough pieces by using a gripper unit with at least one retaining jaw and two movable spaced shaping jaws, in particular a device according to the afore-mentioned embodiments, comprising the following steps:

First a transport of straight dough pieces to a forming station is performed. How this transport is done is herein initially immaterial.

According to the invention the retaining jaw is lowered closely to a dough piece underlay or the conveyor belt. This movement does not necessarily have to be exactly vertical, but can also be a combination of a motion vertical to the underlay and an approaching motion towards the dough piece. It is for example possible, to lower the retaining jaw relative to a gripper carrier or preferably the gripper unit with the retaining jaw. By then closing the gripper unit the necessary force for positioning and forming the dough piece can be transferred in a form-fitting manner.

Further the two shaping jaws are moved until they come into contact with the dough piece on the opposite side according to the invention. Due to this motion of the shaping jaws to the dough piece a clamping of the dough piece between shaping jaw and retaining jaw is performed.

Finally, according to the invention, the shaping jaws are pivoted while forming a curved or annular dough piece. By pivoting the shaping jaws while taking along the ends of the dough piece a desired result is achieved.

Herein it is particularly advantageous if the first shaping jaw performs a pivot motion that is planar, curved, elliptical or circular for forming the dough piece. The second shaping jaw on the other hand performs a combined motion of a pivot motion that is symmetrical to the first shaping jaw over the middle plane and a lifting motion in the direction of the pivot axis. Herein the second end of the dough piece is placed above the first end of the dough piece at the termination of the pivot motion of the shaping jaws by means of the lifting motion of the second shaping jaw.

The application of the combined motions of the two shaping jaws leads to the particularly advantageous shape of the respective dough pieces. In this way a corresponding annular shape is made possible in a particularly simple manner.

The use of a press plunger is particularly advantageous, which presses together the overlapping ends of the dough piece. Herein the retracting motion of the shaping jaws is triggered during or shortly after the contact of the press plunger with the dough piece.

In particular, it is made sure by this embodiment that the dough piece retains its annular shape after the shaping process is completed and does not flap open again afterwards or during the subsequent baking process.

Further it is advantageous if prior to the lowering of the retaining jaw the position of the respectively arriving dough piece is scanned for its position on a conveyor belt. Herein the gripper unit is subsequently placed above the respective dough piece.

Herein it is particularly advantageous if the dough piece can be brought into a target position by means of the gripper unit. This can happen simultaneously with the pivot motion of the shaping jaws or interrupting the pivot motion.

In a special embodiment it is further possible that the position scanner recognizes the middle tip of a wound croissant dough piece from its winding. Herein the gripper unit is moved substantially vertically to the middle axis of the dough piece relative to the conveyor belt before all jaws, i.e. the retaining jaws and the shaping jaws, come into contact with the dough piece. By means of this motion, in particular during contact of the retaining jaws to the dough piece, the dough piece can be put into a rolling motion due to its rolled shape. Herein it is possible, as an improvement, to set the retaining jaws in a simultaneous corresponding vertical motion. Due to this method step it is in particular made sure that the shaping into a U-shape or annular shape of wound croissant dough pieces always happens in the same manner and that therefore no bending open or flapping open of the middle tip of the originally triangular dough sheet occurs.

In the following figures examples for the shaping process and for devices according to the invention are illustrated.

FIGS. 4a-4c shows the sequence of shaping a wound dough piece with the position of the shaping and retaining jaws;

Figure 1:
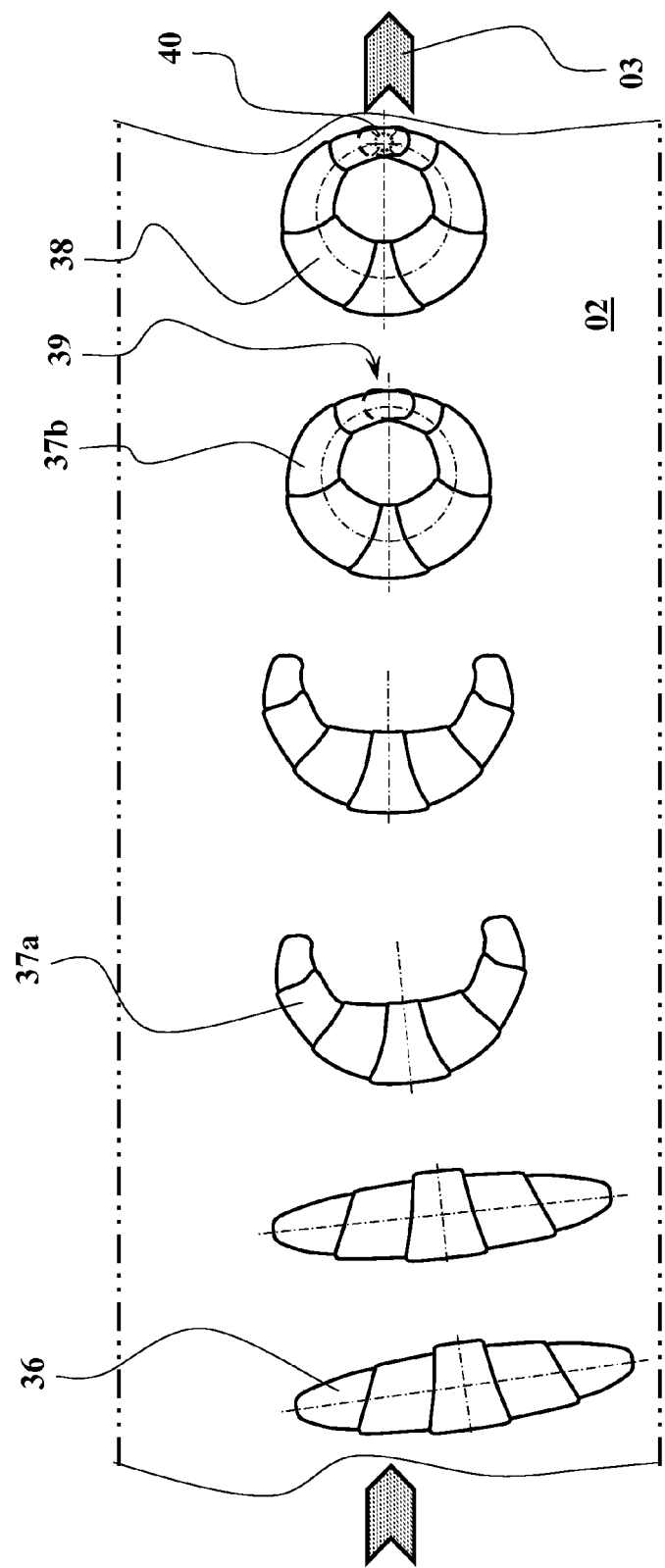
FIG. 1 shows a course of the shaping process starting from a wound dough piece to an annular dough piece.
Figure 5A:
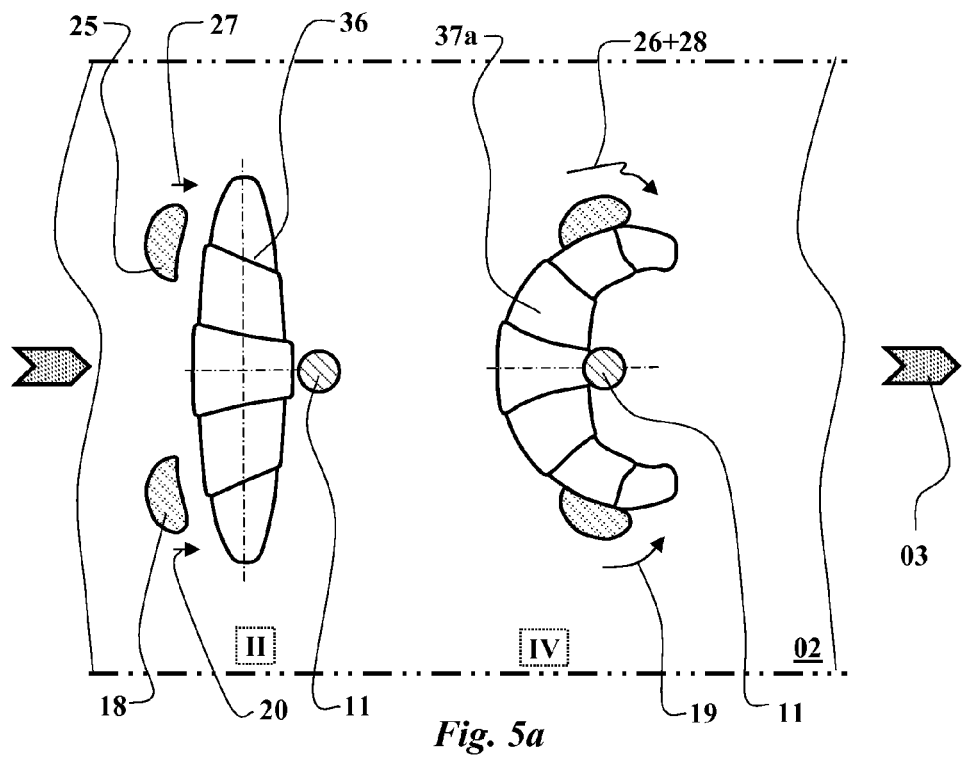
Figure 5B:
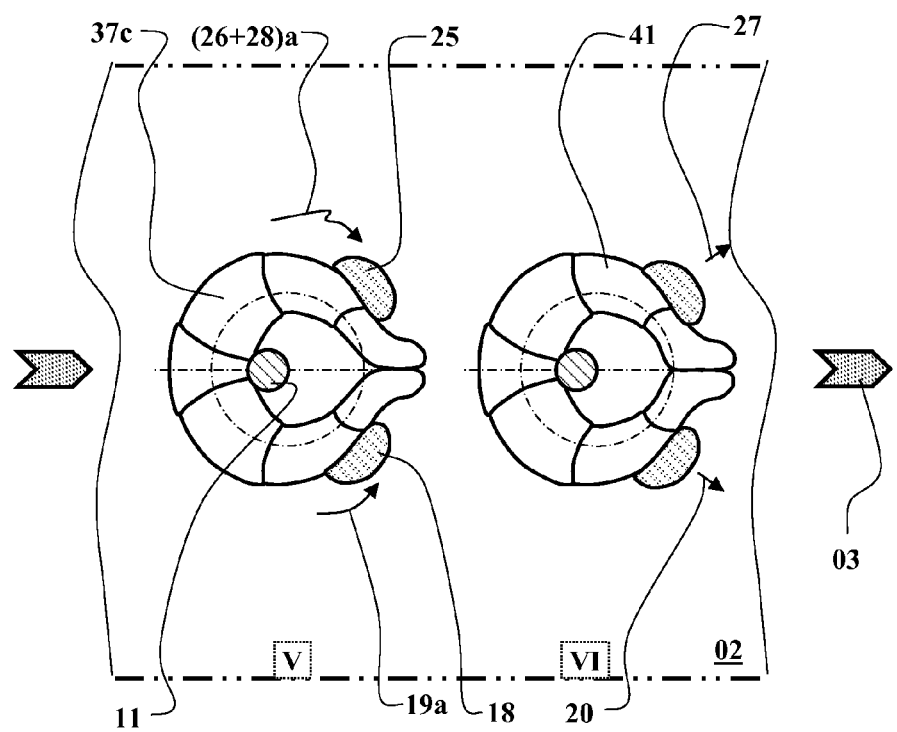

FIGS. 5a-5b shows an alternative embodiment of a gripper unit with the shaping of the dough piece FIG. 1 exemplarily shows the shaping of a croissant dough piece starting from a straight wound shape 36 to an annular shape 38. Herein the wound dough piece 36 is moved on a conveyor belt 02 into a transport direction 03. In a preferred embodiment of the device or method according to the invention, said dough piece 36 can be placed arbitrarily on the conveyor belt 02. Subsequently, the shaping via a first curved shape of the dough piece 37a to an annular shape 37b takes place. Herein the ends of the annular dough piece 37b are disposed in an overlapping manner 39. Then the dough piece 38 is finished by adding an embossing 40 of the overlapping ends 39 of the dough piece.

Figure 2:
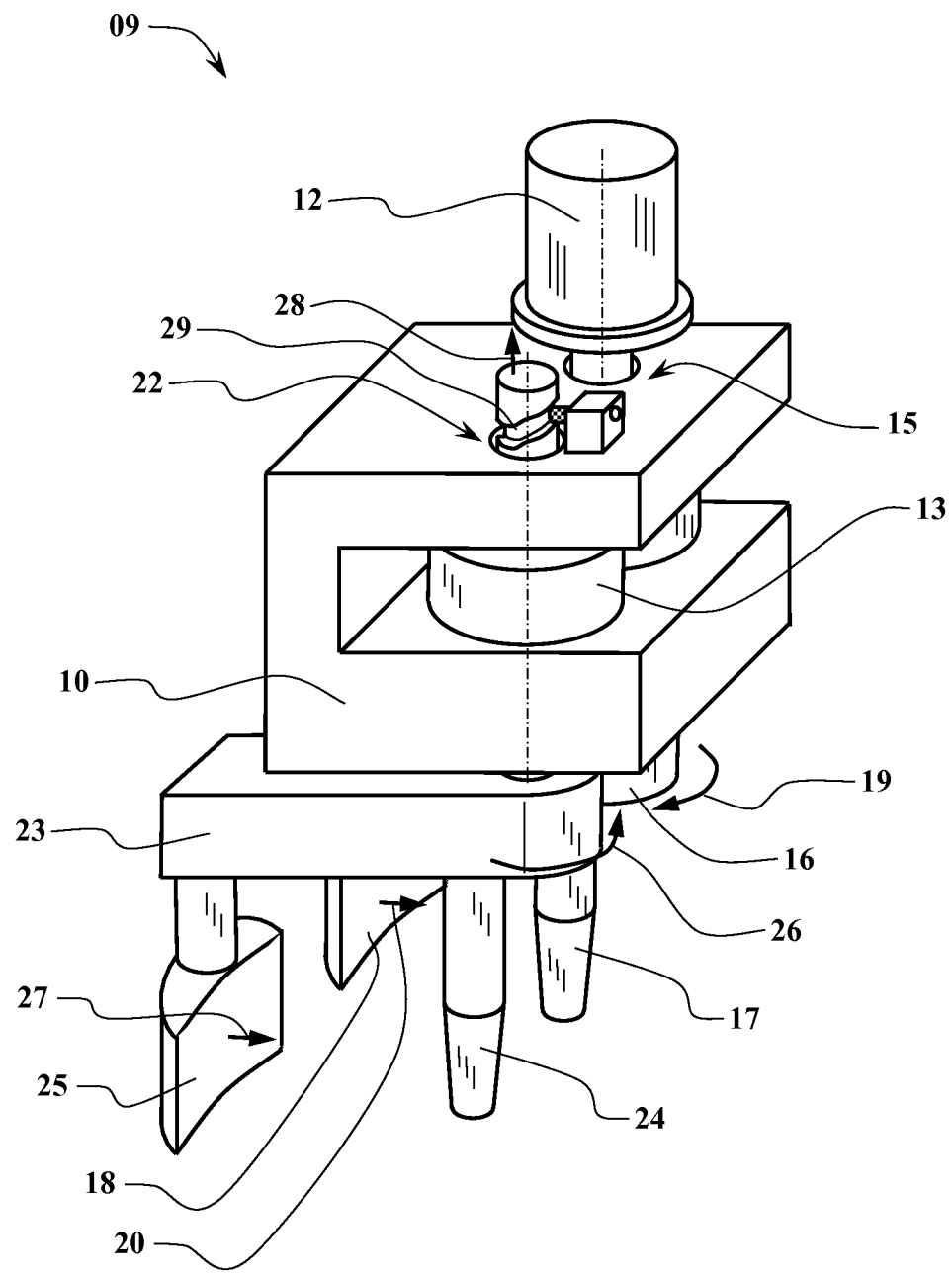
FIG. 2 shows a first example of an embodiment of a device or gripper unit according to the invention.

FIG. 2 is a sketch of a first example of an embodiment of a device according to the invention. The illustrated gripper unit 09 in its simplest form can directly form the device 01 according to the invention or is advantageously connected with a displacement unit not illustrated here. The gripper unit 09 herein comprises as a start the gripper carrier 10. Below the gripper carrier 10 the two pivot carriers 16 and 23 are illustrated. They are pivotably supported by means of a shaft in the gripper carrier 10. The coupling of those two pivot carriers 16, 23 is done by means of a pivot gear 13. Through this it is made sure that the two pivot carriers 16, 23 perform a corresponding opposite pivot motion 19, 26 according to the invention. They are driven by a pivot drive 12 which is exemplarily positioned above a shaft of a pivot carrier 16 and is attached to the gripper carrier 10. Retaining jaws 17, 24 are respectively rigidly connected to the pivot carriers 16, 23. The shaping jaws 18, 25 according to the invention are positioned so as to be movable relative to the pivot carrier 16, 23. In the illustrated example the shaping jaws 18, 25 perform a linear contact motion 20, 27 in the direction of the retaining jaws 17, 24. Thus the dough piece disposed in between is clamped in by the contact motion 20, 27. The pivot motion 19, 26 leads to a corresponding shaping of the dough piece into a corresponding U-shape or annular shape. For realizing the lifting motion of the second pivot carrier it is proposed in this case that a sliding block guide 29 with a groove in the shaft of the second pivot carrier 23 with a pin on the gripper carrier 10 is used. When the pivot motion 26 is performed the corresponding sliding block guide 29 leads to the lifting motion 28 of the second pivot carrier 23 and thus to the lifting motion of the second retaining jaw 24 and of the shaping jaw 25.

Figure 3:
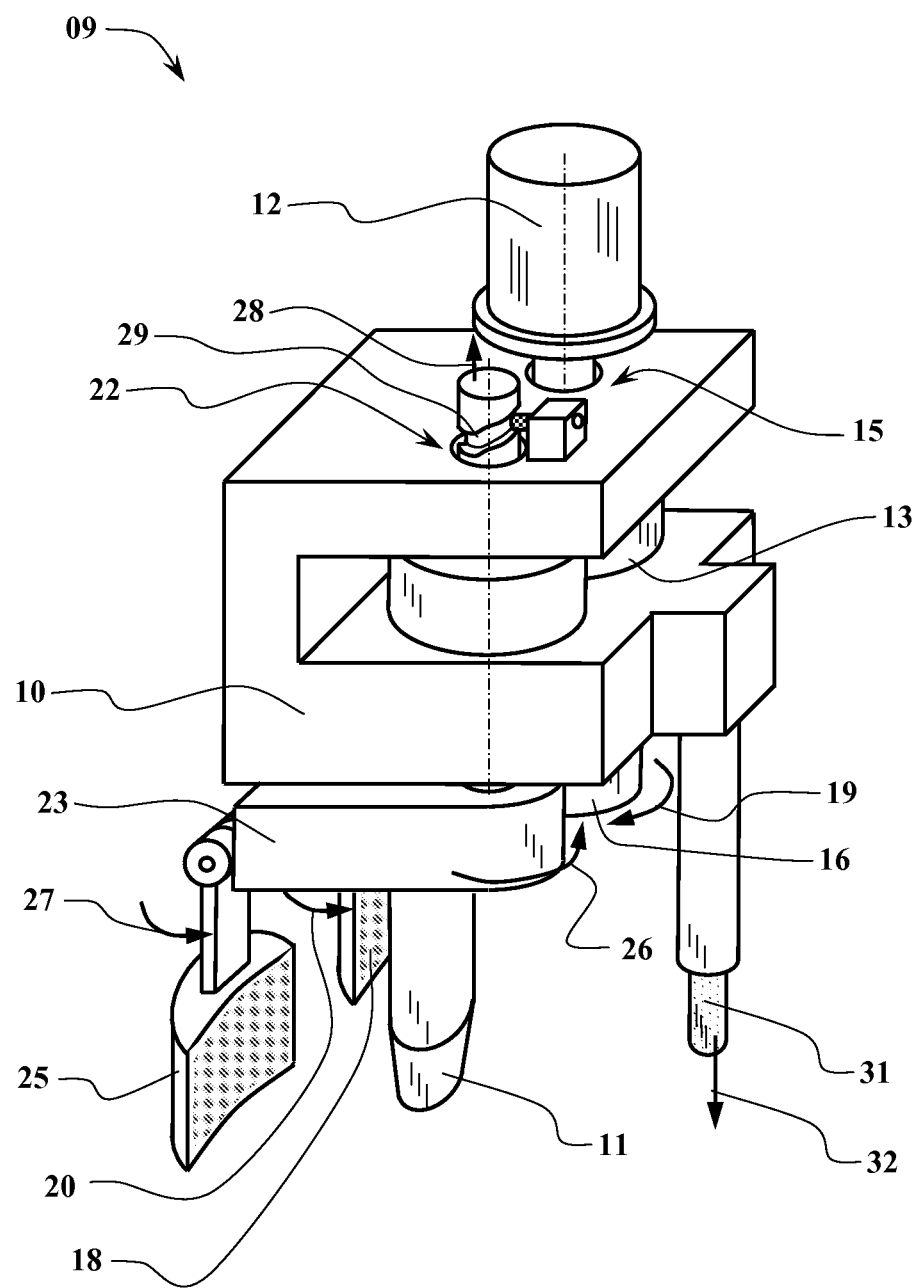
FIG. 3 shows an alternative example of an embodiment of a device or gripper unit according to the invention.

FIG. 3 is a sketch of an alternative embodiment of a gripper unit 09 according to the invention for a device. In contrast to the previously described solution this gripper unit 09 comprises a retaining jaw 11 which is rigidly connected to the gripper unit 09. It is formed conically towards the end of the retaining jaw 11. This makes sure in particular that no undesired scraping motion or deformation of the dough piece takes place when the gripper unit 09 performs a vertical approaching motion or a lifting motion away from the dough piece to be formed or being formed. In contrast to the previously described solution the shaping jaws 18, 25 are further turnably supported on the pivot carriers 16, 23. Accordingly, the shaping jaws 18, 25 perform a turning motion as a contact motion 20, 27. Also, as in the previously described solution, it is made sure that the shaping jaws 18, 25 are moved substantially vertically to the middle axis towards the dough piece. Further illustrated in this embodiment is the use of a press plunger 31. It is supported on the gripper carrier 10 and can perform a corresponding lifting motion 32. The position of the press plunger 31 is herein situated above the overlapping ends of an annularly formed dough piece.

The following figures are sketches of particularly advantageous embodiments of the method according to the invention for forming a dough piece 36. 37. 38 41. The forming process is flowing without taking on explicit intermediate states. Thus, the illustrated steps are snapshots of the process.

Figure 4A:
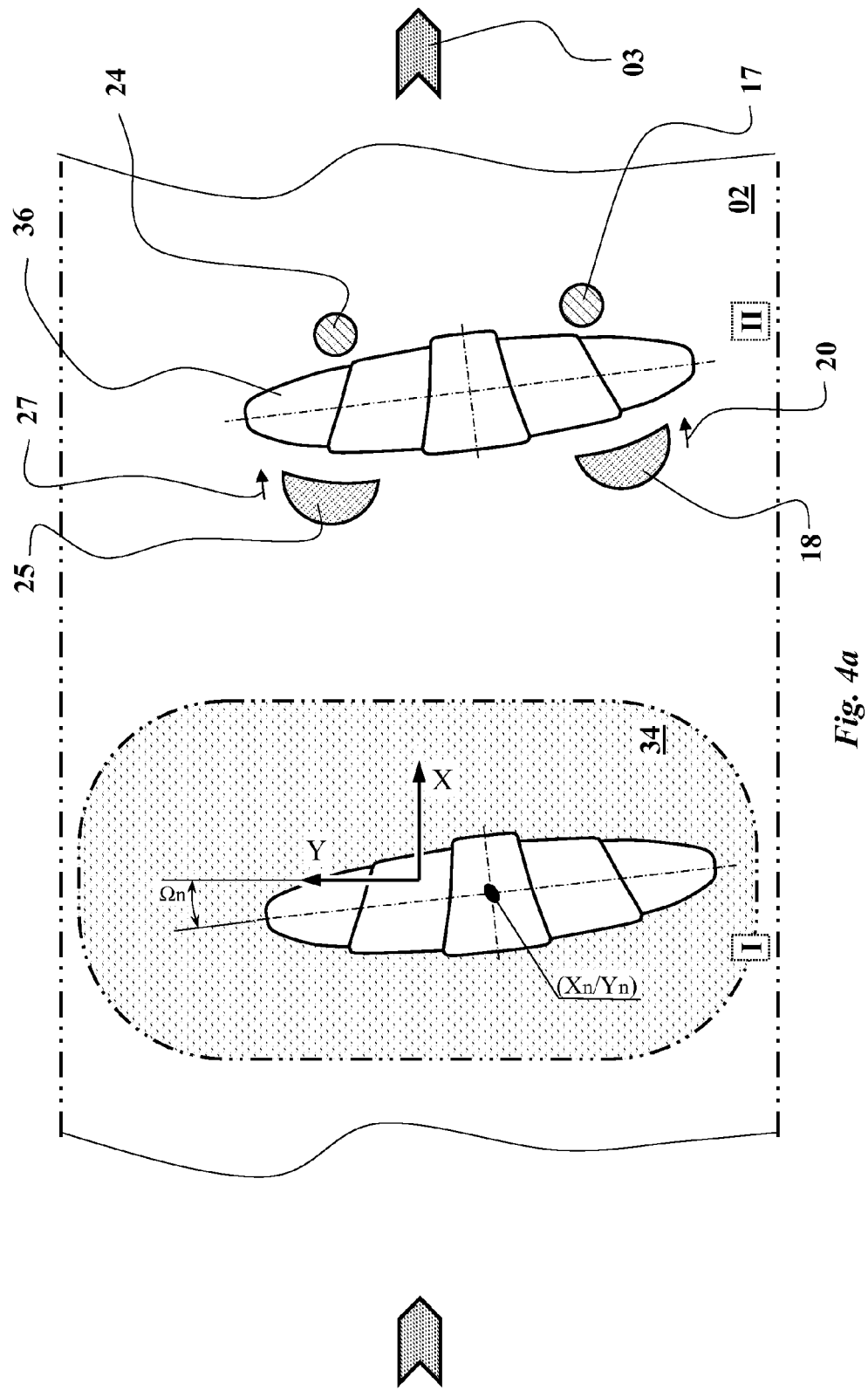

FIG. 4a in a process step I illustrates how a dough piece 36 arbitrarily placed on the conveyor belt 02 can be captured by a position scanner in a scan area 34. Thereby the deviance from a reference position can be determined.

In the following process step II it is illustrated how the retaining jaws 17, 24 have been brought towards the dough piece 36 and how subsequently the two shaping jaws 18, 25 are driven against the dough piece by means of the contact motion 20, 27.

FIG. 4b in process step III illustrates how the dough piece 37a, now clamped between the retaining jaws 17, 24 and the shaping jaws 18, 25, is deformed in the process by the pivot motion 19, 26. At the same time it is possible to bring the croissant dough piece 37a from the original position into a target position by means of an adjusting motion 07 and using a displacement unit. All the while the process of forming the dough piece 37a (step IV) can continue unhindered.

Figure 4C:
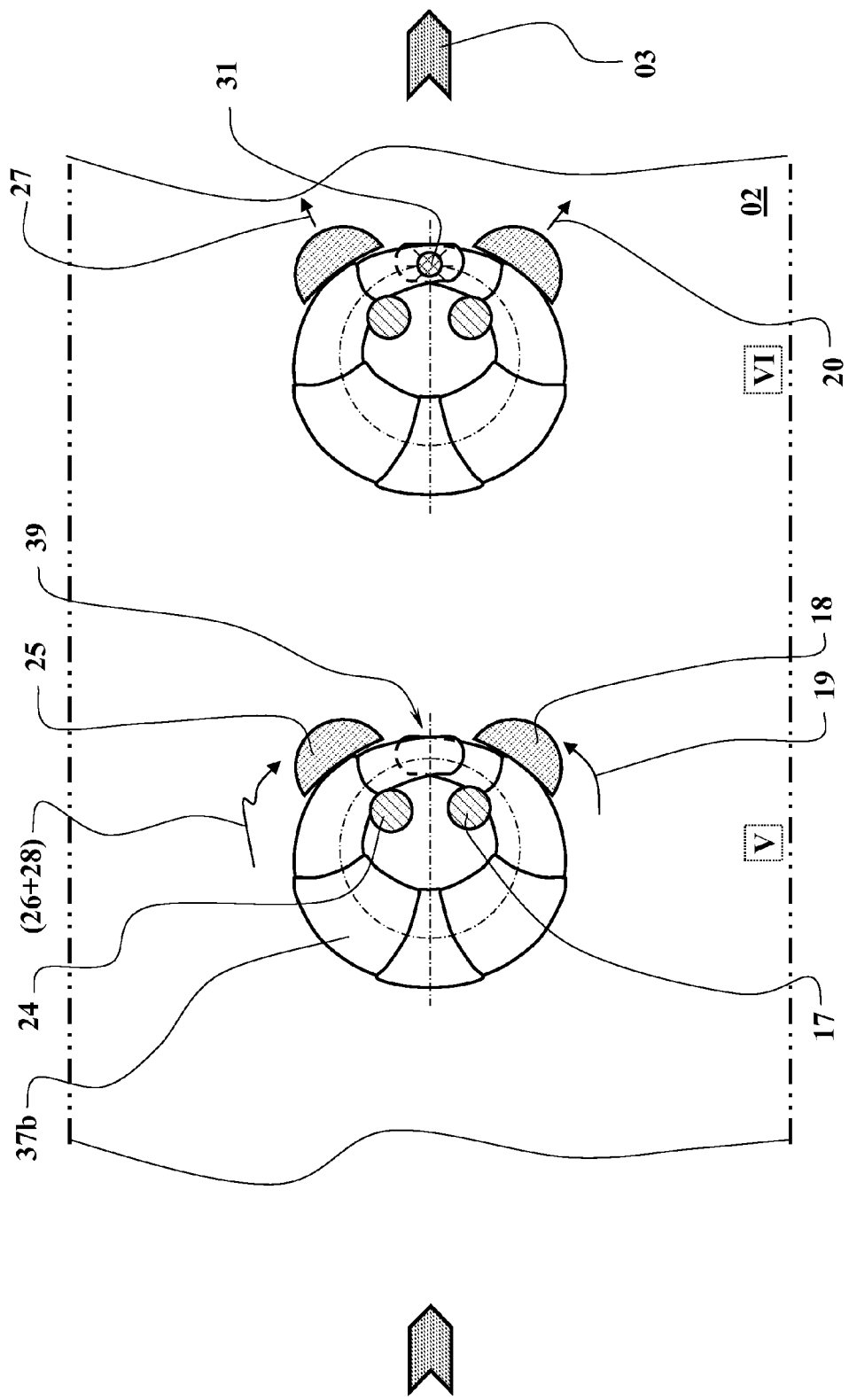

FIG. 4c in process step V illustrates how the dough piece 37b has been formed into a ring by the retaining jaws 17, 24 and the shaping jaws 18, 25. Due to the combined motion of the second retaining jaw 24 and shaping jaw 25 by the pivot motion 26 in combination with the lifting motion 28 the overlapping 39 of the dough piece 37b is made possible.

Then in process step VI the pressing of the overlapping dough piece ends 39 by means of a press plunger 31 follows. In this motion the contact motion 20, 27 of the shaping jaws 18, 25 is reversed as soon as the plunger touches the dough piece and the clamping of the dough piece 37b is released. To support the removal of the dough from the press plunger 31, air can temporarily be blown out of a nozzle at the front end of the press plunger 31.

In an alternative embodiment FIG. 5 shows the forming by means of a gripper unit 09 comprising a retaining jaw 11 and two spaced shaping jaws 18, 25. Herein the retaining jaw 11 is not pivoted along, but remains in the same position relative to the dough piece 36, 37, 41 and the shaping jaws 18, 25 are guided in a circle around the retaining jaw 11.

Further it is possible without any problems to use a fixed retaining jaw as well as to provide in combination one movable retaining jaw per pivot carrier.

The invention claimed is:

1. A method for producing U-shaped or annular dough pieces from substantially straight-dough pieces using a gripper unit comprising at least one retaining jaw and first and second movable spaced shaping jaws, said method comprising the following steps:
    transporting substantially straight dough pieces on a conveyor comprising a forming station;
    lowering the at least one retaining jaw toward a dough piece being transported on the conveyor, wherein lowering of the at least one retaining jaw is controlled such that the dough piece on the conveyor is disposed between the at least one retaining jaw and the first and the second shaping jaws;
    moving the first and the second shaping jaws until each of the first and the second shaping jaws come into contact with a side of the dough piece;
    simultaneously pivoting and lifting one of the first and second shaping jaws relative to the other of the first and second shaping jaws to lift one end of the dough piece relative to another end of the dough piece wherein the lifted end of the dough piece comes to a rest above the other end of the dough piece to form an annular dough piece.

2. The method according to claim 1, wherein the first and second shaping jaws simultaneously pivot symmetrically over a middle plane, and a lifting motion is in a direction of a pivot axis of the second shaping jaw, wherein one end of the dough piece comes to a rest above the other end of the dough piece at a termination of the pivot movement of the shaping jaws.

3. The method according to claim 2, further comprising pressing together the one end of the dough piece resting on the other end of the dough piece with a press plunger, wherein during or shortly after a contact of the press plunger with the dough piece the first and second shaping jaws return to a starting position prior to engaging another dough piece.

4. The method according to claim 1, further comprising determining a position of an arriving dough piece on the conveyor belt and positioning the gripper unit above the arriving dough piece before lowering the retaining jaw.

5. The method according to claim 1, in which the gripper unit is moved with the dough piece such that the dough piece is taken to a target position simultaneously with at least one of the pivot motion of the shaping jaws and interruption of the pivot motion.

6. The method according to claim 1, wherein at least one of the first and second shaping jaws pivots in at least one of a flat, arc-shaped, elliptical or circular pivot motion.

7. A method for producing annular dough pieces from substantially straight dough pieces using a gripper unit comprising at least one retaining jaw and a first and a second movable spaced shaping jaws, said method comprising the following steps:
    transporting substantially straight dough pieces on a conveyor comprising a forming station;
    lowering the at least one retaining jaw toward a dough piece being transported on the conveyor, wherein lowering of the at least one retaining jaw is controlled such that the dough piece is disposed between the at least one retaining jaw and the first and the second shaping jaws;
    moving the first and the second shaping jaws until each of the first and second shaping jaws come into contact with a corresponding side of the dough piece;
    simultaneously pivoting the first and the second shaping jaws symmetrically over a middle plane, and lifting one of the first and second shaping jaws relative to the other of the first and second shaping jaws to lift one end of the dough piece relative to another end of the dough piece, wherein the one end of the dough piece comes to a rest above the other end of the dough piece to form an annular dough piece.

8. The method according to claim 7, wherein at least one of the first and second shaping jaws pivots in at least one of a flat, arc-shaped, elliptical or circular pivot motion.

9. The method according to claim 7, further comprising pressing together the ends of the dough piece after the annular dough piece is formed.

10. The method according to claim 9, wherein the step of pressing together the ends of the dough piece comprises pressing with a press plunger.

11. The method according to claim 10, wherein the first and the second shaping jaws return to a starting position prior to engaging another dough piece during contact of the press plunger with the annular dough piece.

12. The method according to claim 10, wherein the first and the second shaping jaws return to a starting position prior to engaging another dough piece after contact of the press plunger with the annular dough piece.

13. The method according to claim 7 further comprising determining a position of an arriving dough piece on the conveyor belt and positioning the gripper unit above the arriving dough piece before lowering the retaining jaw.

14. The method according to claim 7 in which the gripper unit is moved with the dough piece such that the dough piece is taken to a target position simultaneously with at least one of the pivot motion of the shaping jaws and interruption of the pivot motion.

* * * * *

UNITED STATES PATENT AND TRADEMARK OFFICE
CERTIFICATE OF CORRECTION

PATENT NO. : 9,456,613 B2
APPLICATION NO. : 14/746161
DATED : October 4, 2016
INVENTOR(S) : Udo Bernhardt et al.

Page 1 of 1

It is certified that error appears in the above-identified patent and that said Letters Patent is hereby corrected as shown below:

On the title page, item 30 under Foreign Application Priority Data:
"Jul. 1, 2010" should be --Jul. 19, 2010--

Signed and Sealed this
Thirteenth Day of December, 2016

Michelle K. Lee
*Director of the United States Patent and Trademark Office*